Figure 4:
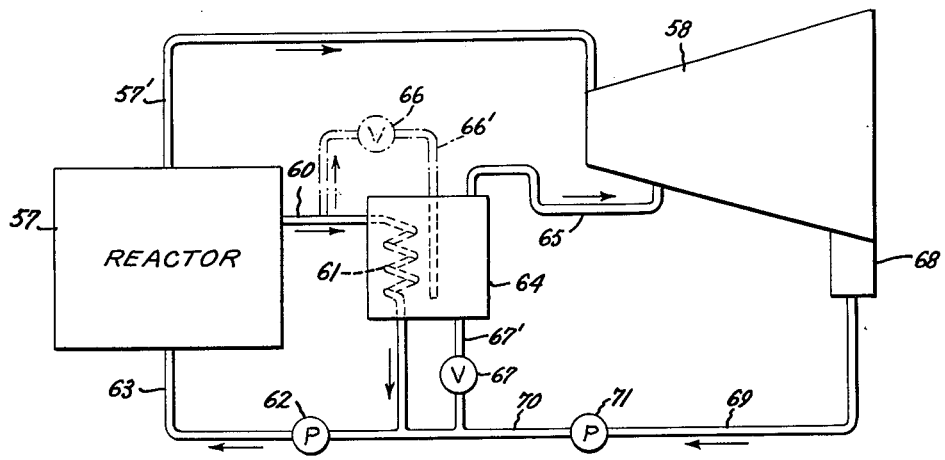

April 10, 1962
S. UNTERMYER
3,029,197
BOILING REACTORS
Filed Sept. 11, 1956
3 Sheets-Sheet 1
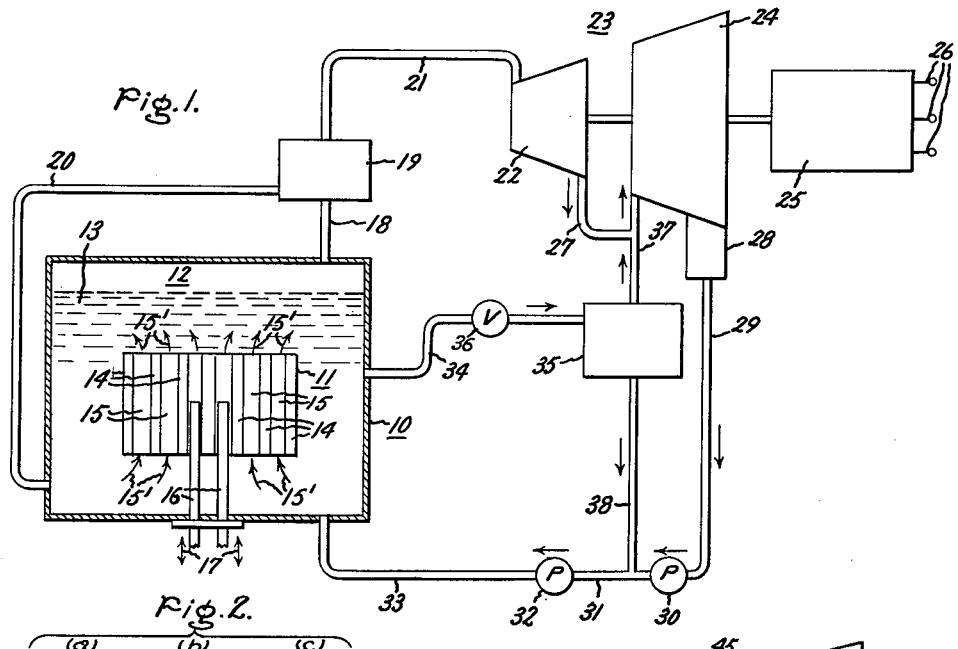
Fig. 1.
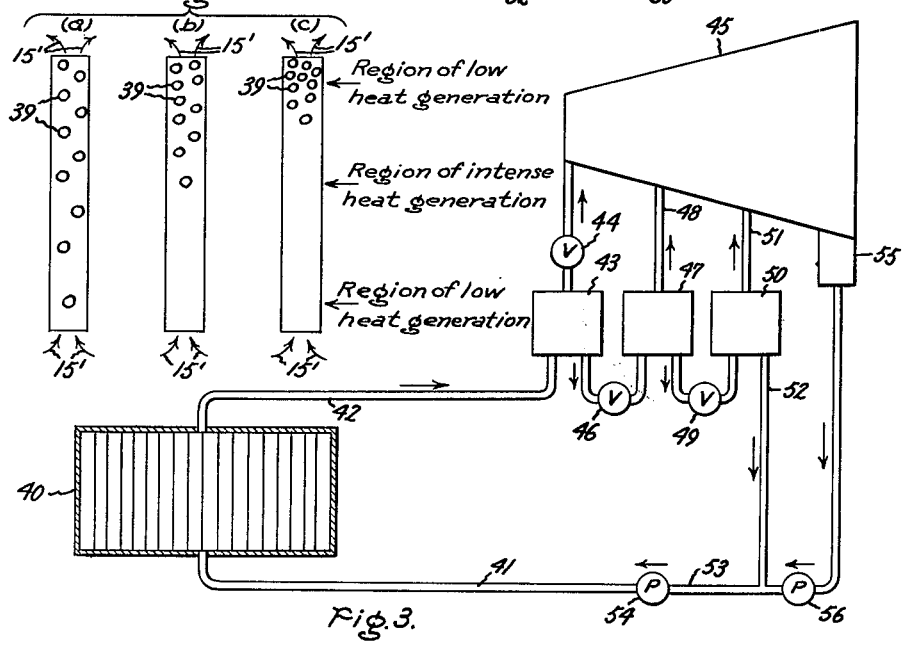
Fig. 2.
Fig. 3.
Inventor:
Samuel Untermyer,
by Leonard B. Mackey
His Attorney.

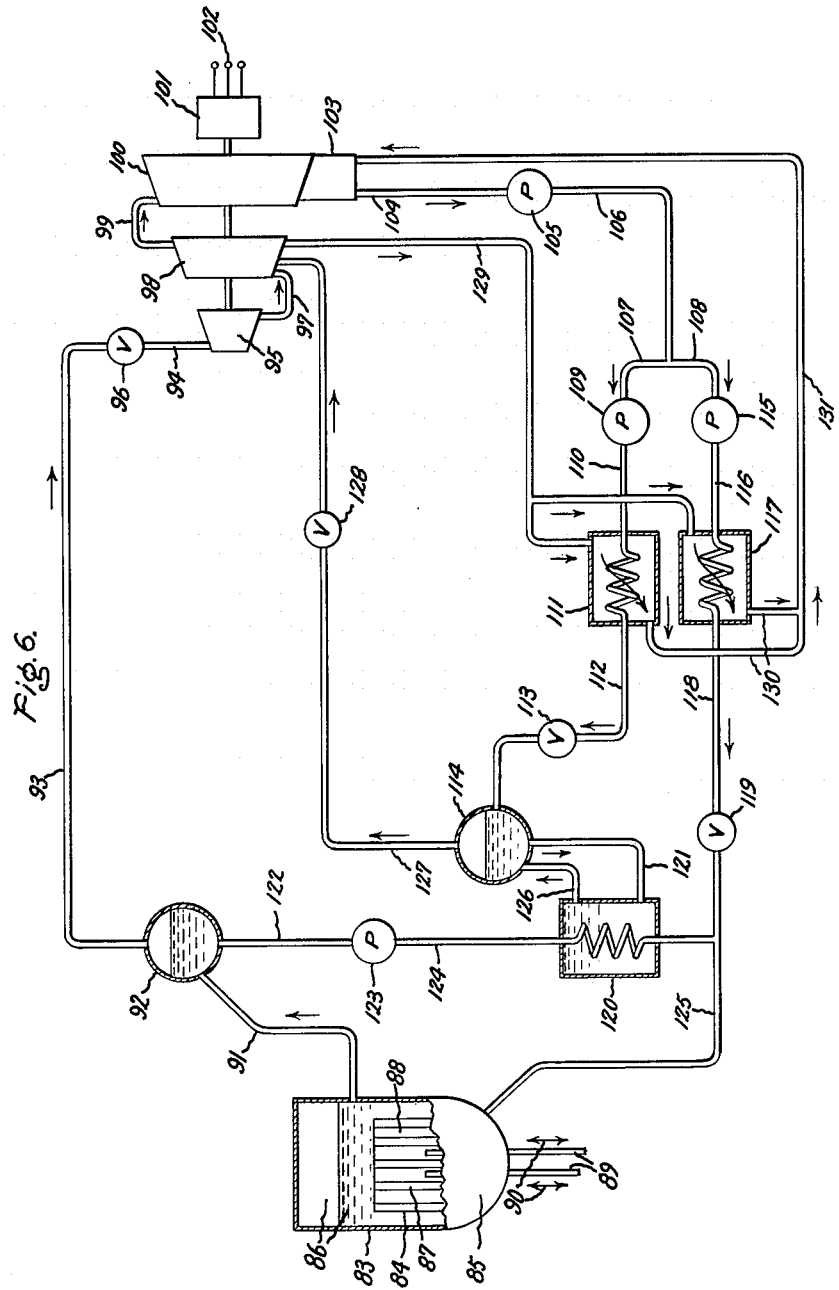

United States Patent Office 3,029,197
Patented Apr. 10, 1962

3,029,197
BOILING REACTORS
Samuel Untermyer, Atherton, Calif., assignor, by mesne assignments, to the United States of America as represented by the United States Atomic Energy Commission
Filed Sept. 11, 1956, Ser. No. 609,242
16 Claims. (Cl. 204—193.2)

This invention relates to boiling reactors and methods of operating boiling reactors which are particularly adapted for use in nuclear power plants. While the practice of this invention is subject to a wide variety of modifications and variations, it is suited for use with boiling water-type reactors and turbine systems and is particularly described in this connection. This application is a continuation-in-part of my now abandoned application, Serial No. 497,063, filed March 28, 1955, and assigned to the same assignee as this application.

Heretofore, a nuclear reactor built for power purposes might include a nuclear chain reacting assembly, a primary coolant in a liquid state circulating in heat exchanging relationship with the assembly, and a secondary fluid, for example water, heated to vaporization by the primary coolant in a heat exchanger to provide power to a prime mover such as a turbine.

Thus, a typical prior art reactor generally includes nuclear fuel, a coolant, and a moderator substance. The coolant may act as the reactor moderator. For example, the coolant may be heavy water which also operates as a moderator or the reactor may include nuclear fuel, light water coolant and a graphite, beryllium, or heavy water, moderator. Control rods or other control means are generally provided to control the reactivity of the reactor; i.e., the fission rate within the reactor.

A boiling reactor differs from such reactors in that at least a portion of the coolant is converted into a vapor state within the reactor. The heat energy in the coolant is utilized either directly or indirectly through a heat exchanger to provide power for a prime mover. For example, the coolant may consist of light water which provides steam to drive a steam turbine.

Boiling reactors can be categorized into two general types. The self-regulating type reactor is one in which an increase in reactor power causes an immediate decrease in reactivity which in turn reduces the reactor power. This type of reactor is said to fail safe. The auto-catalytic type reactor is one in which an increase in reactor power causes an increase in reactivity resulting in a further increase in reactor power. If the reactor operation is not otherwise limited, this condition may cause the reactor to destroy itself.

A more complete discussion of the theory of operation of boiling reactors appears in my article in Nucleonics, volume 12, No. 7, July 1954, pages 43 to 47.

The ensuing description of this invention will be more easily understood by a brief definition at this point of the term "sub-cooling" which may be defined as the removal of heat from coolant to lower the temperature of the coolant below the boiling temperature for a given operating pressure. That is, sub-cooled coolant is coolant which is in a liquid state at a given temperature and pressure and generally this term designates a liquid which is at a temperature somewhat below the boiling point for a given pressure. Also, at a given pressure, the greater the sub-cooling, the greater will be the heat required to cause the liquid to boil.

The practice of this invention is generally concerned with self-regulating type reactors. Either a light or heavy-water cooled reactor can be designed so that boiling or vaporization of the water coolant will have the desired regulating effect on reactivity. For example, a reactor can be constructed so that the reactivity decreases steadily as coolant is expelled from within the reactor. Alternatively, a reactor can be proportioned so that expulsion of the first small fraction of coolant reduces reactvity only slightly while the expulsion of twice as much coolant greatly reduces the reactivity.

The proportion of steam voids or absence of liquid state coolant in such a self-regulating reactor determines the maximum energy output of the reactor. For example, if 20% by volume of the coolant within a reactor is in a vapor state, a reactor is said to have 20% vapor voids. In a typical reactor, the maximum decrease in reactivity that can be tolerated within the operating range of the reactor is of the order of 3% which corresponds in such a typical reactor to approximately 20% steam or vapor voids. Thus, the maximum permissible fraction of steam voids limits the power available from the reactor. This limitation becomes more apparent when it is appreciated that the amount of available energy in a boiling water reactor is determined by the amount of available steam or vapor state coolant.

Therefore, it is particularly desirable to provide a means of increasing the energy obtainable from the reactor so that the heat obtainable from the reactor is generally determined by heat transfer to the coolant and not steam voids.

A power plant may be subject to fluctuating loads. Such fluctuating loads further complicate the operation of boiling reactors. Since the reactor contains a large volume of saturated water, it will momentarily deliver enough steam to prevent rapid changes in pressure in the reactor vessel. If, for example, a turbine suddenly demands more steam, as a result of opening the turbine throttle valve, the saturated cooling water will "flash" into steam to provide the deficiency. The resulting steam voids tend to decrease the reactor power. To offset this, the control rods must be withdrawn until steam generation by fission heat balances demand.

It is apparent, therefore, that it would be advantageous to provide, independent of frequent repositioning of control rods, a substantially self-regulating apparatus and method for boiling reactor operation under fluctuating load conditions.

It is a general object of this invention to provide improved boiling reactor systems and methods of operation thereof.

Another object of this invention is to provide boiling reactor systems and methods of operation thereof resulting in enhanced reactor power output as compared to previously known boiling reactor systems.

It is also an object of this invention to provide a power system including a boiling reactor wherein the power system is substantially self-regulating with respect to load.

According to an important aspect of this invention, there is provided a boiling reactor system including a volatile liquid coolant and a nuclear chain reacting assembly for heating said coolant and vaporizing a portion thereof. The reactivity of the reactor is reduced by expulsion of liquid state coolant. Energy is extracted from a substantially liquid state portion of the coolant and additional energy may be extracted from vaporized coolant. Sub-cooled coolant is provided to the reactor to reduce the portion of the coolant within the reactor which includes vaporized coolant and thereby enhance the reactor power output.

For example, when operated as a portion of a complete power equipment, the reactor system of this invention may be considered as operating on a dual cycle; i.e., energy is extracted from vaporized coolant and from substantially liquid state coolant. A change in load changes the amount of sub-cooling and thereby the power available from the reactor. Thus, the reactor system is substantially self-regulating with respect to load.

Other objects and important aspects of this invention will become apparent from the following specification and claims when taken with the figures of the drawing wherein FIGURE 1 is a semi-schematic embodiment of a boiling reactor power system incorporating this invention; FIGURE 2 is a diagrammatic illustration of reactor coolant channels useful in explaining this invention; and FIGURES 3, 4, 5, and 6 illustrate other examples of embodiments of this invention.

In FIGURE 1, there is illustrated a reactor vessel 10 including a reactor core 11 and a steam dome or region 12 above the surface of coolant 13. The reactor proper is composed of a plurality of nuclear fuel members 14 with coolant channels 15 therebetween.

The coolant is heated by flowing through channels 15 as illustrated by the arrows 15′. Horizontal reactor channels may be utilized in the practice of this invention if forced feed is utilized. However, to simplify this description, only vertical channels are illustrated. As the coolant rises through channels 15, it absorbs heat which causes a plurality of vapor bubbles to form in the liquid and to rise up through the channels. The percentage or concentration of these vapor bubbles, or steam voids in the case of a boiling water reactor, affects the reactivity of the reactor. In accordance with this invention, sub-cooling of the coolant in the reactor vessel results in steam being formed closer to the outlet ends or upper ends of channels 15 so that the power output of the reactor is enhanced.

The reactivity of the reactor core 11 is controlled by a plurality of control rods 16 which can be moved in and out of a portion of the channels as indicated by arrows 17 in order to obtain the desired rate of fission. Steam from steam dome 12 is carried by pipe 18 to steam drum 19 where the water is removed and returned by drain 20 to the base of reactor vessel 10.

Steam from steam drum 19 is carried by pipe 21 to the input of the high pressure turbine 22 of multi-stage turbo-generator 23. Turbo-generator 23 consists of a high pressure multi-stage turbine 22 and a low pressure multi-stage turbine 24 connected on a common shaft to drive generator 25 from which electrical energy can be obtained from output terminals 26. Exhaust steam from high pressure stage 22 is carried by pipe 27 to multi-stage low pressure turbine 24. Exhaust steam from turbine 24 is condensed in condenser 28 and carried by pipe 29 to circulating pump 30. Water from pump 30, flows through pipe 31 to pump 32 and in this sub-cooled state is re-introduced into reactor vessel 10 through pipe 33. This is the steam phase or cycle of this reactor system.

In the water phase or cycle of this reactor system, high temperature liquid state water is extracted from vessel 10 by pipe 34 and flows to heat utilizing apparatus 35. This heat utilizing apparatus, for example, may be a heat exchanger, which is used to heat water to form steam for the low pressure stages of the turbine, or, as in this specific embodiment, the heat utilizing apparatus 35 may consist of a "flash" chamber. A pressure reduction nozzle 36 sprays high temperature water into chamber 35 which is maintained at a lower pressure than the reactor vessel 10 so that a portion of the hot water immediately flashes into steam which is carried through pipe 37 to the low pressure turbine 24. The portion of the liquid state coolant or water which is not flashed into steam in flash chamber 35 is returned through pipe 38 to pump 32 which discharges this water along with the water from condenser 28 into reactor vessel 10.

The system described in connection with the illustration in FIGURE 1 may be considered a dual cycle boiling reactor system; there being a steam or vaporized coolant cycle and a liquid state coolant cycle both of which supply energy from the reactor to the turbo-generator. The coolant is in the examples herein described, light water but without departing from the spirit of this invention, may consist of other coolants such as, for example, heavy water or other materials having a relatively high latent heat of vaporization. Water is particularly desirable for utilization in commercial power applications of this invention because of its relatively short radioactive half life (of the order of seconds) which renders the likelihood of contamination of piping and turbine equipment relatively slight thereby minimizing the hazards to operating personnel.

The fuel utilized in the practice of this invention may consist of any suitable fissionable composition having the necessary resistance to corrosion and irradiation effects.

It should be noted that appropriate radiation shielding is provided around reactor vessel 10 and around other equipment and piping and that illustration of such shielding has been eliminated from the illustration in FIGURE 1 in order to simplify the description of this invention. Also, in order to simplify the description of this invention, a number of additional elements necessary for a complete operating system have been eliminated from the showing, such as for example, turbine throttle valves, purifiers to provide and maintain pure coolant for the reactor, steam separators, feedwater heaters, a condenser cooling system, and all instruments and controls.

The operation of a reactor system in accordance with this invention will become more apparent from the following theoretical discussion in connection with consideration of FIGURE 2 wherein reactor channel (a) illustrates the conditions generally obtaining in conventional boiling water reactors. Channels (b) and (c) illustrate the conditions obtaining in more idealized reactors incorporating this invention. Channel (c) illustrates conditions obtaining with a high degree of sub-cooling. The flow of coolant through the channels is generally indicated by arrows 15′. The circles are representative of bubbles of vaporized coolant and the concentration of bubbles 39 is representative of the percentage of vapor voids in a given portion of the channel. Due to the natural convection of the coolant through the channels, the vapor bubbles tend to rise and to become increasingly concentrated at the upper end of the reactor core.

In order to simplify the following discussion, it has been assumed that given sized voids will have the same nuclear effect regardless of their position within the reactor. Moreover, in the following simplified explanation, power generation along the reactor coolant channels has been taken to be uniform.

However, more elaborate calculations have been made which allow for variation in power generation throughout the reactor, as well as for the dependence of the effect of voids on the position within the reactor. These calculations substantiate the conclusion that sub-cooling provides increased power.

Channel (a) illustrates a boiling reactor in which saturated liquid is admitted to the bottom of the coolant channel. Heat from the nuclear fuel immediately vaporizes some of the liquid, forming bubbles which are distributed throughout the length of the coolant channel. In such a reactor, the heat output is normally limited by the rate that vapor can be generated and leave the core without exceeding a given fraction of voids within the reactor core; i.e., the power output is limited by the void fraction and the velocity at which bubbles leave the core. As an illustration, ten bubbles have been shown within coolant channel (a).

Some sub-cooled liquid can be provided in a conventional boiling reactor plant, if regenerative feedwater heating is not used. For instance, in a conventional boiling reactor, generating 600 pounds per square inch steam, approximately 30% of the generated heat may be used to raise the water temperature to the boiling point. Thus, without feedwater heating, substantially no boiling would occur until the coolant has passed through 30% of the length of the coolant channel. Elimination of regenerative feedwater heating has the serious disadvantage of reducing thermal cycle efficiency.

In accordance with this invention, means are provided for removing energy from the liquid within the reactor cooling system. This provides a source of sub-cooled liquid which is introduced to the reactor cooling channels and permits utilization of regenerative feed-water heating.

In channel (b), approximately half the reactor heat is used to raise the temperature of the liquid, while half the heat is used to form vapor. Substantially no bubbles are formed until the liquid passes through the lower half of the coolant channel. The same number of bubbles are formed as in channel (a), but these bubbles are now confined to the upper portion of the reactor, so that, for the same coolant velocity and for the same number of bubbles within the reactor coolant channel, twice as many bubbles are produced per unit of time. Hence, the vapor generation rate is twice as great as in channel (a).

That is, the vapor output from a coolant channel is limited by the vapor bubble velocity and the vapor bubbles per unit volume near the exit end of the channel. The introduction of sub-cooled coolant results in the same number of vapor bubbles concentrated near the exit end of the core. Thus, increased power output can be obtained since more vapor bubbles leave the coolant channel per unit time. Reactivity remains high since the number of vapor bubbles remains constant.

Moreover, a substantially equal amount of heat is used to heat the liquid prior to formation of steam. Hence, the total reactor heat generation rate and available power is four times greater in channel (b) than in channel (a); i.e., twice as much heat is available in the form of vapor and twice as much heat is available from liquid state coolant, while the vapor void fraction is substantially the same in both cases.

In channel (c), approximately three-quarters of the reactor heat is used to heat liquid and approximately one-quarter of the heat is used to produce steam. By similar reasoning, it can be shown that the total power output for the same void fraction is approximately sixteen times greater than in channel (a).

The fraction of voids at the mid-height of channel (b) is much less than the fraction in channel (a), and it is to be noted that the liquid at the mid-height of channel (c) includes substantially no vapor bubbles. In a reactor, the heat generation is usually most intense near the central portion of the reactor core, and heat transfer is most critical in this region. More heat can be safely transferred to liquids below the boiling point, or to slightly boiling liquids, than can be transferred to mixtures of liquids with large volumes of vapor. Consequently, as this invention reduces the extent of boiling in the region of maximum heat generation, it reduces the likelihood of the fuel elements overheating.

The illustrations of FIGURES 1 and 2 make it apparent that the control stability of the over-all system is improved by the practice of this invention, since compensation for load fluctuations may largely be accomplished by adjusting the fraction of power removed from the non-boiling portion of the cycle. That is, the steam generated in the heat exchanger or flash chamber may be utilized primarily to accommodate changes in load demands. When this is done, an increased load demand merely increases the fraction of power removed in the non-boiling cycle which in turn increases the sub-cooling of the water entering the reactor. This reduces the amount of steam voids in the reactor and, as a consequence, this causes an increase in reactivity of the reactor which in turn serves to increase the available reactor power and meet the load demand. Therefore, it is apparent that the system is substantially self-regulating with respect to load.

As as specific example of a reactor system incorporating the practice of this invention, it may be assumed that the system illustrated in FIGURE 1 is designed for approximately 180,000 net electrical kilowatts output. A reactor core approximately 9 feet in diameter and 9 feet high might be utilized.

In this specific design, approximately one-half of the steam is generated within the reactor core, the remaining steam being generated by flashing reactor water into steam at a lower pressure within flash chamber 35. Water enters the reactor core in a sub-cooled condition so that about 60% of the reactor channel height is filled with sub-cooled water and boiling occurs in the upper 40% of the channel only. This arrangement allows approximately twice as much power to be removed from the reactor directly in the form of steam without exceeding conservative limitations on steam voids within the reactor core. In addition, an amount of power approximately equal to that removed by steam is removed from the flash cycle so that for a given average reactor void content, the combination flash cycle and steam cycle permits extraction of approximately four times as much power from a given core size as could be removed using a convention boiling cycle.

The reactor operating pressure is determined by the reactivity of the reactor, adjusted by control rods 16 and the turbine throttle valve and is maintained at 600 pounds per square inch absolute. This operating pressure is much lower than that which would be necessary for the same temperature in a non-boiling pressurized water reactor and results in an operating water temperature of approximately 486° F.

The flash chamber operating pressure may be controlled by action of the turbine governor on the low pressure turbine throttle valve and is maintained at a pressure of approximately 350 pounds per square inch absolute when the system is developing rated output. This pressure will vary from full reactor pressure at low power when no steam is being taken from flash chamber 35 down to (with this design) 350 pounds per square inch at full power output, when approximately 50% of the steam is generated in the flash chamber.

The percentage of water entering the flash chamber which is converted into steam is determined by the temperature of the incoming water and the pressure in the flash chamber. Under full load conditions, with this design, the relation of water inlet temperature and flash chamber pressure is such that approximately 8% of the water entering the flash chamber is converted into steam. Less than 8% of the water would be flashed into steam when the reactor is operating at partial load. At full load, water leaves the flash chamber at saturation temperature of 350 pounds per square inch at a temperature of 432° F. which is 54° F. below the saturation temperature of water in the reactor.

Water returning to the reactor from the flash chamber is mixed with the turbine condensate which has been heated to 206° F. in a conventional regenerative feed-water heater (not shown). The temperature of the mixture as it enters the reactor is approximately 401° F. corresponding to 85° F. below the saturation temperature in the reactor tank. This mixture provides the necessary sub-cooled coolant for the system.

From the preceding data, a power output of approximately 35 kilowatts per liter of reactor core and steam consumption of approximately 15 pounds per kilowatt hour is indicated. Thus, the amount of water evaporated per hour in the flash chamber and the reactor at full load may be computed to be approximately $2.7 \times 10^6$ pounds. If it is assumed that approximately one-half of the steam is produced in the flash chamber and that approximately 8% of the water entering the tank is flashed into steam, then at full load approximately 18.3×10⁶ pounds of water per hour flow into the reactor.

Under conditions of partial generator load both the steam flow from the flash chamber and from the reactor are reduced. The system is designed so that the steam flow from the flash chamber is reduced first so that at partial load of approximately 25%, substantially all of the steam is supplied directly from the reactor. This design results in improved thermal efficiencies at partial load.

As has been previously mentioned, when a sudden power demand occurs, the pressure in the flash chamber falls slightly, so that flow of sub-cooled water into the reactor increases and the temperature of the sub-cooled water decreases. For example, a power demand on the turbine results in the low pressure turbine throttle valve opening. This momentarily reduces the pressure in the flash chamber thereby increasing the steam flow from this chamber. Therefore, the flow of water to the chamber from the reactor increases. Pump 32 is regulated in a conventional manner to hold a fixed water level in tank 35 and hence this pump returns more sub-cooled water to the reactor. Decreased flash chamber pressure also results in more water flashing into steam and increases the cooling of the water in the flash chamber.

That is, more water enters flash chamber 35 and the temperature of the water in the flash chamber falls. The lowered temperature and greater quantity of the sub-cooled water returning to the reactor momentarily reduces the steam voids within the reactor resulting in more reactivity and a higher reactor output to meet the demand. Therefore, the reactor system is self-regulating with respect to load changes.

From the preceding example, it is evident that the practice of this invention results in obtaining higher power density than heretofore obtainable in a boiling reactor and thereby more power from a given size reactor.

FIGURE 3 illustrates another embodiment of the practice of this invention utilizing forced circulation. The reactor vessel 40 does not include a steam dome but instead includes a core member and enclosure into which sub-cooled water is pumped through pipe 41. The vertical lines in 40 represent fuel elements which define reactor coolant channels. As the water is pumped through the reactor, it is heated and a combination of steam and water is carried by pipe 42 to steam drum 43 where steam is separated from the water and flows through throttle valve 44 to the high pressure input stage of turbine 45. Water from steam drum 43 flows through pressure reducing valve 46 into flash chamber 47 which is maintained at reduced pressure so that a portion of the hot water is flashed into steam which is introduced to an intermediate stage of turbine 45 through line 48. That portion of the water which is not flashed into steam in flash chamber 47 flows through reducing valve 49 to flash chamber 50 which is maintained at a lower pressure than 47 where additional steam is generated. This steam is introduced through pipe 51 into a low pressure stage of turbine 45. That portion of the water which is not flashed into steam in flash chamber 50 is returned to the reactor through pipe 52, pipe 53, circulating pump 54, and pipe 41. The condensate from the turbine exhaust is condensed in condenser 55 and is returned to the reactor by pumps 56 and 54.

In this specific embodiment, sub-cooled water is reintroduced into the reactor by pumps 54 and 56. Non-boiling coolant is extracted with vaporized coolant and is separated therefrom in steam drum 43. The non-boiling coolant is subsequently flashed into steam in flash chambers 47 and 50. It will be readily apparent, that in lieu of flash chambers 47 and 50, appropriate heat exchangers may be substituted to extract energy from the non-boiling coolant.

An example of a system utilizing a heat exchanger, and which is similar to the system illustrated in FIGURE 1, is illustrated in FIGURE 4. A reactor including a steam header such as that illustrated in FIGURE 1 provides steam through pipe 57' to the high pressure stage of multi-stage turbine 58. The hot water output from reactor 57 flows through pipe 60, heat exchanger coil 61 and is returned, as sub-cooled coolant, by pump 62 to the input of the reactor 57 through pipe 63. The output of heat exchanger 64 is fed to an intermediate pressure stage of turbine 58 by pipe 65. The heat exchanger 64 may be provided with coolant through valve 66 and pipe 66' (shown in dashed lines). Alternatively, makeup feed can be supplied to the heat exchanger through valve 67 and line 67'. The discharge of turbine 58 is condensed by condenser 68 and is pumped through pipes 69 and 70 by pump 71.

Valve 66 and pipe 66' may be used to regulate makeup feed water for heat exchanger 64, and may be connected to a conventional makeup feed regulator. In a typical reactor using valve 66, less than 10% of the volume of water flowing out of the reactor through line 60 is fed to line 66' and then vaporized in tank 64.

Figure 5:
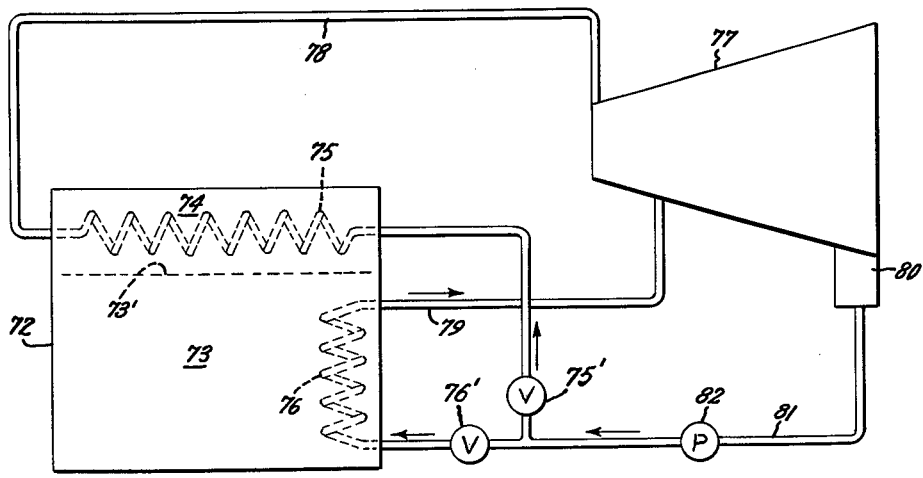

FIGURE 5 illustrates a homogeneous reactor including a container 72 containing a homogeneous fissionable solution 73 which includes the coolant. A steam head or chamber 74 for vaporized coolant is provided by the upper part of container 72. Steam head 74 is filled with vapor resulting from vaporization of solution 73. A heat exchanger 75 is passed through the region of the vaporized coolant. Another heat exchanger 76 is utilized to extract heat energy from the liquid state coolant. Valves 75' and 76' regulate the flow of heat transfer medium to heat exchangers 75 and 76, respectively. The homogeneous fissionable solution may consist of a solution or slurry prepared with either heavy or light water and containing the necessary concentration of fissionable material to sustain a chain reaction.

In order to limit the degree of radioactivity introduced into turbine 77, a separate heat transfer medium, for example water, is passed through heat exchanger 75 and pipe 78, to supply steam to the high pressure input of turbine 77. Lower pressure steam is provided by heat exchanger 76. This steam flows through pipe 79 to an intermediate stage of turbine 77. The turbine discharge is condensed by condenser 80, flows through pipe 81 and is recirculated by circulating pump 82.

The pressure in reactor container 72 is established by the design characteristics of the reactor and associated power plant. For instance, a pressure of 1,000 pounds per square inch could be maintained in tank 72, generating steam at 600 pounds per square inch in coil 75 and generating lower pressure steam at 400 pounds per square inch in coil 76.

In order to simplify this description, makeup feed-water equipment, steam drums, water purification equipment, and other apparatus necessary for operation of this system have not been illustrated.

In this embodiment, the dual cycle comprises reactor heat extraction from vaporized coolant by heat exchanger 75 and from liquid state coolant by heat exchanger 76. Sub-cooled coolant is effectively provided to the reactor by the normal convection circulation of the homogeneous fissionable solution through heat exchanger 76. This substantially confines the formation of vapor bubbles to a region in the vicinity of top surface 73' of the homogeneous fissionable solution.

FIGURE 6 illustrates reactor vessel 83 which includes the reactor core 84, a lower plenum 85, and an upper plenum 86. Vessel 83 has an inside diameter of approximately 12 feet 8 inches and is approximately 41 feet high. The reactor core 84 is composed of a plurality of nuclear fuel elements 87 with coolant channels 88 therebetween. A removable cover at the top of vessel 83 permits access to change fuel elements 87. The reactivity of the reactor core 84 is controlled by a plurality of control rods 89 which can be moved in and out of the channels as indicated by arrows 90.

In this specific system, the reactor fuel elements 87 consist of uranium dioxide pellets contained within a tube of zirconium alloy. The fuel elements are fastened together in groups of 25 to facilitate handling and are supported within square channels. These channels rest on a bottom support structure (not shown) which is supported by lower plenum 85. There are 712 vertical square channels arranged so that the shape of the core 84 approximates a right circular cylinder approximately 9 feet 6 inches in diameter and 9 feet high.

There are seventy control rods 89 which move in and out of the core 84 in spaces made available by omitting fuel elements 87 in the regular pattern. Each rod 89 can be continuously positioned independently of the other rods 89. The rod drive mechanism (not shown) may comprise a hydraulic cylinder and piston located near the bottom of the reactor vessel 83.

Water in lower plenum 85 flows up through the channels 88 and is heated. The upper plenum 86 has a region filled with a mixture of steam and water with a volume of steam above. The mixture of steam and water is carried in pipe 91 to a primary steam drum 92 where the steam is separated from the water by any conventional apparatus such as centrifugal steam separators. The primary steam drum 92 is approximately 8 feet in diameter and 60 feet long.

Steam from the steam drum 92 is carried in pipe 93 and pipe 94 to high pressure turbine stages 95. The flow of steam is regulated by throttle valve 96 which may be manually or automatically controlled so that a constant pressure is maintained in the reactor vessel 83. Exhaust steam from the high pressure turbine stages 95 passes through a pipe 97 to intermediate pressure turbine stages 98. Exhaust steam from the intermediate pressure turbine stages 98 passes through a crossover 99 to low pressure turbine stages 100. Turbine stages 95, 98, and 100 drive generator 101 from which electrical energy can be obtained from output terminals 102.

Exhaust steam from low pressure turbine stage 100 is condensed in condenser 103. Condensate is carried in pipe 104 to a condensate pump 105 and leaves through pipe 106. The flow in pipe 106 splits with a portion passing through pipe 107 and the remaining portion passing through pipe 108. That portion which goes through pipe 107 then passes through a feedwater pump 109, pipe 110, and a series of feedwater heaters shown as a single heater 111. Water from heater 111 flows through pipe 112 and valve 113 into secondary steam drum 114. The water level in steam drum 114 is controlled by valve 113.

Water passing through pipe 108 is pumped by feedwater pump 115, passes through pipe 116 and a series of feedwater heaters illustrated as a single heater 117. The feedwater from the feedwater heaters 117 returns to reactor vessel 83 through pipe 118 and valve 119.

The secondary steam generating unit includes secondary steam drum 114 and heat exchanger 120. Water in secondary steam drum 114 flows to heat exchanger 120 through downcomer 121 and is heated by saturated water separated from the steam in steam drum 92 which flows through downcomer 122, recirculating pump 123, and pipe 124 to the heat exchanger 120. After heating water to form steam in heat exchanger 120, the now sub-cooled water from drum 92 along with condensate from pipe 118, is returned to the reactor vessel by pipe 125.

Part of the water from drum 114 is vaporized in heat exchanger 120 and a mixture of steam and water enters secondary steam drum 114 through riser 126. Steam is separated from the liquid in the steam drum 114. The steam then flows through pipe 127 to intermediate pressure turbine stages 98. The flow of steam in pipe 127 is regulated by valve 128. Valve 128 can be either manually controlled or automatically controlled by the turbine speed governor to adjust the flow of steam in pipe 127 to accommodate the load.

Steam is extracted from the intermediate stages of the turbine and passes through pipe 129 to furnish heat to feedwater heaters 111 and 117. After losing heat to the feedwater, the steam goes to the turbine condenser 103 through pipes 130 and 131. In a system of this type, steam is extracted from a plurality of turbine stages to provide heat to a number of feedwater heaters; however, in order to simplify this description, only one steam tap is illustrated.

In operation, high pressure steam is separated in drum 92 and is supplied to high pressure turbine stages 95. This steam is condensed in condenser 103 and returned to the reactor vessel via pump 119 and line 125. This is the vapor cycle. Liquid state water from drum 92 is used to heat feedwater in heat exchanger 120 and provide low pressure steam. This low pressure steam is supplied to the turbine, is condensed in condenser 103, and returned to steam drum 114. This is the liquid state coolant cycle. Forming low pressure steam in heat exchanger 120 sub-cools the water from drum 92. The sub-cooled water is introduced to reactor 84 to increase the power output of the reactor.

The steam flow to the different pressure stages of the turbine is determined by the over-all turbine load. Initial changes in turbine load are compensated by changing the output of secondary steam drum 114. This results in a change in the amount of water from condenser 103 which flows to secondary steam drum 114 and the amount of water returning directly to the reactor vessel 83.

Thus practice of the dual cycle principle of this invention is incorporated in the nuclear power system illustrated in FIGURE 6.

An example of typical conditions obtaining for full load and an example of conditions obtaining for partial load operation of this system appear in Table I.

*Table I*

| | Full Load | Part Load |
|---|---|---|
| Reactor Power, megawatts (heat) | 697 | 349 |
| Electrical Power Output at Terminals 102, megawatts | 212 | 103 |
| Pressure in Reactor Vessel 83, (p.s.i.a.) | 1,017 | 1,017 |
| Enthalpy of Water in Pipe 125, (B.t.u/lb.) | 495.2 | 528 |
| Water Flow Rate in Pipe 125, (lbs./hr.) | 28,667,000 | 28,667,000 |
| Steam Flow Rate in Pipe 93, (lbs./hr.) | 1,580,000 | 1,172,000 |
| Steam Flow Rate in Pipe 127, (lbs./hr.) | 1,324,800 | 205,000 |
| Enthalpy of Water in Pipe 124, (B.t.u./lb.) | 533.2 | 522 |
| Pressure in Steam Drum 92, (p.s.i.a.) | 1,000 | 1,000 |
| Pressure in Steam Drum 114, (p.s.i.a.) | 510 | 875 |
| Enthalpy of Feedwater in Pipe 112, (B.t.u./lb.) | 381.5 | 315 |
| Enthalpy of Feedwater in Pipe 118, (B.t.u./lb.) | 381.5 | 315 |
| Pressure in Condenser 103, (inches of Hg) | 2½ | 2½ |
| Net Plant Heat Rate, (B.t.u./kwh.) | 11,925 | 12,320 |
| Fraction of Reactor Power Used in Raising Water to Saturation Temperature | 0.60 | 0.41 |
| Fraction of Reactor Power Used in Vaporizing Water | 0.40 | 0.59 |
| Fraction of Area for Flow at Top of Reactor Core Filled with Steam | 0.458 | 0.35 |
| Approximate Fraction of Core Volume Filled with Steam | 0.17 | 0.17 |

In view of the preceding description, it is apparent that this invention results in high power density in a boiling reactor wherein the reactor power output is generally determined by the heat transfer to the coolant, and not by vapor voids. Practice of this invention also provides a boiling reactor system which is inherently self-regulating.

While this invention has been described with regard to a number of specific embodiments, it will be apparent to those skilled in the art that the practice of this invention may be carried out with a wide variety of apparatus and methods. Therefore, it is intended in the appended claims to cover all modifications which come within the true spirit and scope of this invention.

What I claim as new and desire to secure by Letters Patent of the United States is:

1. A boiling reactor apparatus comprising a heterogeneous nuclear chain-reacting assembly provided with coolant flow channels through which a volatile liquid coolant flows to be heated and partially vaporized, said assembly having a reactivity which is reduced by expulsion of liquid state coolant therefrom, means for separating the partially vaporized coolant discharged from said assembly to provide a separate unvaporized coolant portion, means for extracting energy and subcooling the separated unvaporized coolant, and means for introducing subcooled coolant into said assembly to reduce the portion of the coolant which includes vaporized coolant within said assembly whereby the power output of said apparatus is enhanced and said apparatus is substantially self-regulating.

2. A boiling reactor apparatus comprising a heterogeneous nuclear chain-reacting assembly provided with coolant flow channels through which a volatile liquid coolant flows to be heated and partially vaporized, said assembly having a reactivity which is reduced by expulsion of liquid state coolant therefrom, means for separating the partially vaporized coolant discharged from said assembly to provide separate vaporized and unvaporized coolant portions, means for extracting energy from the separated vaporized coolant portion, means for extracting energy and subcooling the separated unvaporized coolant portion, and means for introducing subcooled coolant into said assembly to reduce the portion of the coolant which includes vaporized coolant within said assembly whereby the power output of said apparatus is enhanced and said apparatus is substantially self-regulating.

3. A boiling reactor apparatus which comprises a heterogeneous nuclear chain-reacting assembly provided with coolant flow channels extending from the coolant inlet end to the coolant outlet end of said assembly and through which channels a volatile liquid coolant passes to be heated and partially vaporized, said assembly having a reactivity which is reduced by an increase in the volume of vaporized coolant therein, means for separating partially vaporized coolant discharged from the coolant outlet end of said assembly to provide separate vaporized and unvaporized coolant portions, cooling means for subcooling the separated unvaporized coolant portion, and means for returning at least part of the subcooled liquid coolant from said cooling means to the inlet end of said assembly to reduce the volume of vaporized coolant within said assembly whereby the power output of said apparatus is enhanced and said apparatus is substantially self-regulating.

4. A boiling reactor apparatus which comprises a heterogeneous nuclear chain-reacting assembly provided with coolant flow channels extending from the coolant inlet end to the coolant outlet end of said assembly and through which channels a volatile liquid coolant passes to be heated and partially vaporized, said assembly having a reactivity which is reduced by an increase in the volume of vaporized coolant therein, a vapor-driven energy utilization means, means for separating the partially vaporized coolant discharged from the coolant outlet end of said assembly to provide separate vaporized and unvaporized portions, means for passing the separated vaporized coolant portion to said energy utilization means, cooling means for subcooling the separated unvaporized coolant portion, and means for returning at least part of the subcooled liquid coolant from said cooling means to the coolant inlet end of said assembly to reduce the volume of vaporized coolant within said assembly whereby the power output of said apparatus is enhanced and said apparatus is substantially self-regulating.

5. A boiling reactor apparatus which comprises a heterogeneous nuclear chain-reacting assembly provided with coolant flow channels extending from the coolant inlet end to the coolant outlet end of said assembly and through which channels a volatile liquid coolant passes to be heated and partially vaporized, said assembly having a reactivity which is reduced by an increase in the volume of vaporized coolant therein, a vapor-driven energy utilization means, means for passing vaporized coolant discharged from the coolant outlet end of said assembly to said energy utilitzation means, cooling means for receiving and subcooling unvaporized coolant discharged from the coolant outlet end of said assembly and for generating additional vapor therefrom, means for passing said additional vapor to said energy utilization means, and means for returning at least part of the subcooled liquid coolant from said cooling means to the coolant inlet end of said assembly to reduce the volume of vaporized coolant within said assembly whereby the power output of said apparatus is enhanced and said apparatus is substantially self-regulating.

6. A boiling reactor apparatus which comprises a heterogeneous nuclear chain-reacting assembly provided with coolant flow channels extending from the coolant inlet end to the coolant outlet end of said assembly and through which channels a volatile liquid coolant passes to be heated and partially vaporized, said assembly having a reactivity which is reduced by an increase in the volume of vaporized coolant therein, a vapor-driven energy utilization means, means for passing vaporized coolant discharged from the coolant outlet end of said assembly to said energy utilization means, cooling means for receiving and subcooling unvaporized coolant discharged from the coolant outlet end of said assembly and for generating additional vapor therefrom, means for passing said additional vapor to said energy utilization means, means for returning coolant from said energy utilization means to the coolant inlet end of said assembly, and means for returning at least part of the subcooled liquid coolant from said cooling means to the inlet end of said assembly to reduce the volume of vaporized coolant within said assembly whereby the power output of said apparatus is enhanced and said apparatus is substantially self-regulating.

7. An apparatus according to claim 6 wherein said vapor-driven energy utilization means comprises a steam-driven turbine, and wherein said volatile coolant is water.

8. An apparatus according to claim 6 wherein said cooling means comprises at least one flash chamber connected in unvaporized coolant-receiving relation to the coolant outlet end of said assembly through a pressure reduction means to produce said additional vapor and said subcooled liquid coolant.

9. An apparatus according to claim 6 wherein said cooling means comprises indirect heat exchanger means connected in unvaporized coolant-receiving relation to the outlet end of said assembly, and means for introducing a stream of liquid coolant into indirect heat exchange relation with said unvaporized coolant in said heat exchanger means to vaporize said stream of liquid coolant and to form said additional vapor therefrom.

10. An apparatus according to claim 9 wherein said means for introducing said stream of liquid coolant is connected in liquid-receiving relation through a pressure reduction means to the coolant outlet end of said assembly.

11. An apparatus according to claim 9 wherein said means for introducing said stream of liquid coolant is connected in liquid-receiving relation to energy utilization means.

12. A boiling water reactor apparatus which comprises a heterogeneous nuclear chain-reacting assembly provided with coolant flow channels extending from the coolant inlet end to the coolant outlet end of said assembly and through which channels water passes and is heated and partially vaporized therein to form a steam-water mixture, said assembly having a reactivity which is reduced by an increase in the volume of steam therein, a steam-water separating drum connected in steam-watermixture receiving relation to the outlet end of said assembly, a multi-stage dual admission steam turbine, an exhaust steam condenser connected to said turbine, means for passing steam from said separating drum into the high pressure stages of said turbine, a secondary steam generating means, means for passing unvaporized water from said separating drum into said secondary steam generating means to generate secondary steam and subcooled water therein, means for passing secondary steam from said generating means into the intermediate stages of said turbine, means for returning condensate from said condenser to said secondary steam generator and to the inlet end of said assembly, and means for returning subcooled water from said secondary steam generator to the inlet end of said assembly.

13. In a boiling nuclear reactor power generation apparatus which comprises a heterogeneous nuclear chain-reacting core assembly provided with coolant flow channels extending from the coolant inlet end to the coolant outlet end of said assembly and through which a volatile liquid coolant flows to be heated and partially vaporized, said assembly having a reactivity which is reduced by an increase in the volume of vaporized coolant therein, a vapor-driven power generation means, means for passing vaporized coolant from the outlet end of said assembly to said power generation means, and means for returning condensate from said power generation means to the coolant inlet end of said assembly, the improvement which comprises secondary vapor generation means, means for introducing unvaporized coolant from the outlet of said assembly into said secondary vapor generation means to generate additional vapor and form subcooled liquid coolant therein, means for passing said additional vapor into said power generation means, and means for passing said subcooled liquid coolant from said secondary vapor generation means to the inlet end of said assembly to enhance the power output of said assembly and make said apparatus substantially self-regulating with respect to load.

14. An improved method of operating a boiling nuclear reactor having a nuclear chain-reacting assembly through which a volatile liquid coolant is passed and is partially vaporized and which assembly has a reactivity which is reduced by expulsion of liquid state coolant therefrom, which method comprises the steps of separating unvaporized liquid coolant and the vaporized coolant discharged from said assembly, extracting heat from and subcooling said unvaporized liquid coolant, and introducing subcooled liquid coolant into said assembly to reduce the portion of the coolant which includes vaporized coolant within said assembly to enhance the power output of said system and render the reactor substantially self-regulating.

15. An improved method of operating a boiling nuclear reactor having a nuclear chain-reacting assembly through which a volatile liquid coolant is passed and is partially vaporized and which assembly has a reactivity which is reduced by expulsion of liquid state coolant therefrom, which method comprises the steps of separating unvaporized liquid coolant and the vaporized coolant discharged from said assembly, extracting energy from the vaporized coolant portion, extracting heat from and subcooling the unvaporized coolant portion to extract additional energy therefrom, and introducing sub-cooled liquid coolant into said assembly to reduce the portion of the coolant which includes vaporized coolant within said assembly to enhance the power output of said reactor and render the reactor substantially self-regulating.

16. In a method for operating a boiling nuclear reactor which comprises passing a volatile liquid coolant through the coolant flow channels of a nuclear chain-reacting assembly to heat and vaporize part of said coolant, said assembly having a reactivity which is reduced by an increase in the volume of vaporized coolant therein, passing vaporized coolant to a vapor-driven energy utilization means, and returning coolant therefrom to said assembly, the improvement in enhancing the power output of said assembly and rendering said assembly substantially self-regulating with respect to load on said energy utilization means which comprises the steps of separating the unvaporized coolant portion from the coolant mixture discharged from said assembly, extracting energy from the unvaporized coolant thereby subcooling it, and returning the subcooled liquid to said assembly to reduce the volume of vaporized coolant in said assembly.

References Cited in the file of this patent
UNITED STATES PATENTS

| | | |
|---|---|---|
| 680,736 | Riblet | Aug. 20, 1901 |
| 2,662,369 | Baggerud | Dec. 15, 1953 |
| 2,787,593 | Metcalf | Apr. 2, 1957 |
| 2,825,688 | Vernon | Mar. 4, 1958 |

OTHER REFERENCES

AECD–3287, Feb. 7, 1952.

Harrer et al.: "Peaceful Uses of Atomic Energy," vol. 3, pp. 250–262, August 1955.

Beall et al.: "Peaceful Uses of Atomic Energy," vol. 3, pp. 263–283, August 1955.

Nucleonics, vol. 12, No. 7, page 46, July 1954.